US010680380B2

(12) United States Patent
Penn et al.

(10) Patent No.: US 10,680,380 B2
(45) Date of Patent: Jun. 9, 2020

(54) ANGLED ELECTRICAL CONNECTOR ASSEMBLY AND METHOD OF MANUFACTURING SAME (71) Applicant: Aptiv Technologies Limited, St. Michael (BB)

(72) Inventors: Matthew L. Penn, Cortland, OH (US); James M. Rainey, Warren, OH (US); Barry Magyaros, Chagrin Falls, OH (US); John R. Morello, Warren, OH (US)

(73) Assignee: Aptiv Technologies Limited (BB)

( * ) Notice: Subject to any disclaimer, the term of this patent is extended or adjusted under 35 U.S.C. 154(b) by 0 days.

(21) Appl. No.: 16/521,023

(22) Filed: Jul. 24, 2019

(65) Prior Publication Data

US 2020/0091650 A1 Mar. 19, 2020

Related U.S. Application Data (60) Provisional application No. 62/730,694, filed on Sep. 13, 2018.

(51) Int. Cl.
*H01R 9/05* (2006.01)
*H01R 13/504* (2006.01)
(Continued)

(52) U.S. Cl.
CPC ......... *H01R 13/504* (2013.01); *H01R 13/405* (2013.01); *H01R 43/20* (2013.01)

(58) Field of Classification Search
CPC .............................. H01R 24/38; H01R 24/545
(Continued)

(56) References Cited

U.S. PATENT DOCUMENTS 5,035,643 A * 7/1991 Forish .................... H01R 33/06
439/354
6,139,334 A * 10/2000 Forish .................. B60Q 1/2607
362/487

(Continued)

FOREIGN PATENT DOCUMENTS

| CN | 105514671 A | 4/2016 |
|----|-------------|--------|
| JP | S6071083 U | 5/1985 |
| JP | 2012216546 A | 11/2012 |

OTHER PUBLICATIONS

European Search Report for Application No. 19196851, European Patent Office, dated Jan. 23, 2020.

(Continued)

*Primary Examiner* — Phuong K Dinh
(74) *Attorney, Agent, or Firm* — Robert J. Myers (57) ABSTRACT An electrical connector assembly includes an electrical terminal having an attachment end and a connection end, a first terminal housing having a first cavity in which the attachment end is disposed. The first cavity defining a terminal extension opening through which the connection end extends. The assembly also includes a second terminal housing having a second cavity in which the connection end is disposed. The second cavity defining a terminal reception opening through which the connection end is received. The first terminal housing defines a first attachment surface surrounding the terminal extension opening and the second terminal housing defines a second attachment surface surrounding the terminal reception opening. The first attachment surface is sealed to the second attachment surface. The first attachment surface forms a first angle relative to the longitudinal axis and the second attachment surface forms a second angle relative to the lateral axis.

18 Claims, 6 Drawing Sheets

(51) Int. Cl.
*H01R 43/20* (2006.01)
*H01R 13/405* (2006.01)

(58) Field of Classification Search
USPC .................................................. 439/582, 585
See application file for complete search history.

(56) References Cited

U.S. PATENT DOCUMENTS

| | | | |
|---|---|---|---|
| 7,604,386 B2* | 10/2009 | Rawlings | F21S 48/1109 362/548 |
| 7,868,259 B2 | 1/2011 | Bermel et al. | |
| 9,667,000 B1 | 5/2017 | Morello et al. | |
| 9,762,001 B2 | 9/2017 | Morello et al. | |
| 9,929,509 B1 | 3/2018 | Penn et al. | |
| 9,960,550 B2 | 5/2018 | Ensley et al. | |
| 2018/0375233 A1 | 12/2018 | Morello et al. | |

OTHER PUBLICATIONS

Branson Contoured Laster Technology Brochure, Emerson Industrial Automation, 2013.

* cited by examiner

FIG. 6 Con't

ANGLED ELECTRICAL CONNECTOR ASSEMBLY AND METHOD OF MANUFACTURING SAME

CROSS-REFERENCE TO RELATED APPLICATION

This application claims the benefit under 35 U.S.C. § 119(e) of U.S. Provisional Patent Application No. 62/730,694 filed on Sep. 13, 2018, the entire disclosure of which is hereby incorporated by reference.

TECHNICAL FIELD OF THE INVENTION

The invention generally relates to electrical connectors, particularly to a an electrical connected wherein an end attached to a wire cable and another end configured to receive a mating connector are angled relative to each other.

BACKGROUND OF THE INVENTION

Coaxial cable connector assemblies have been used for numerous automotive applications, such as global positioning systems (GPS), infotainment systems, and air bag systems. Coaxial cables typically consist of an outer shield conductor, an inner center conductor, a dielectric, and an insulation jacket. The outer conductor and the inner conductor of the coaxial cable often electrically interface with a mating coaxial cable through socket and plug connectors. Such conventional coaxial cable connectors are known in the art.

In order to standardize various types of connectors and thereby avoid confusion, certain industry standards have been established. One of these standards is referred to as FAKRA. FAKRA is the Automotive Standards Committee in the German Institute for Standardization (in German "Deutsches Institut für Normung", best known by the acronym DIN), representing international standardization interests in the automotive field. The FAKRA standard provides a system, based on keying and color coding, for proper connector attachment. Like socket keys can only be connected to like plug keyways in FAKRA connectors. Secure positioning and locking of connector housings is facilitated by way of a FAKRA defined catch on the socket housing and a cooperating latch on the plug housing. The FAKRA standard is contained in the USCAR-18 standard published by the United States Council for Automotive Research (USCAR).

Right angle sealed electrical connector assemblies, such as those conforming to the FAKRA standard, typically require a two piece terminal. These two piece terminals can have inferior electrical performance when compared to a one piece terminal.

A need remains for a right angled sealed electrical connector that can accommodate a one piece terminal.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

According to one embodiment of the invention, an electrical connector assembly is provided. The electrical connector assembly includes an electrical terminal having an attachment end extending along a longitudinal axis configured to be attached to a wire cable and a connection end extending along a lateral axis configured to be attached to a corresponding mating terminal. The electrical connector assembly also includes a first terminal housing having a first cavity extending along the longitudinal axis in which the attachment end is disposed. The first cavity defines a cable opening through which the wire cable extends and defines a terminal extension opening through which the connection end extends. The electrical connector assembly further includes a second terminal housing having a second cavity extending along the lateral axis in which the connection end is disposed. The second cavity defines a terminal reception opening through which the connection end is received and a mating opening configured to receive the corresponding mating terminal. The first terminal housing defines a first attachment surface surrounding the terminal extension opening and the second terminal housing defines a second attachment surface surrounding the terminal reception opening. The first attachment surface is sealed to the second attachment surface. The first attachment surface forms a first angle relative to the longitudinal axis and the second attachment surface forms a second angle relative to the lateral axis.

In an example embodiment having one or more features of the electrical connector assembly of the previous paragraph, the second angle is complementary to the first angle.

In an example embodiment having one or more features of the electrical connector assembly of the previous paragraph, a first angular value of the first angle is about 45 degrees and a second angular value of the second angle is about 45 degrees.

In an example embodiment having one or more features of the electrical connector assembly of the previous paragraph, the first attachment surface defines a circumferential ridge surrounding the terminal extension opening and the second attachment surface defines a circumferential groove surrounding the terminal reception opening in which the circumferential ridge is received.

In an example embodiment having one or more features of the electrical connector assembly of the previous paragraph, the circumferential ridge is welded to the circumferential groove using an infrared laser welding process.

In an example embodiment having one or more features of the electrical connector assembly of the previous paragraph, the first attachment surface is welded to the second attachment surface, thereby forming a watertight joint between the first and second terminal housings.

In an example embodiment having one or more features of the electrical connector assembly of the previous paragraph, the first attachment surface is welded to the second attachment surface using a laser welding process.

In an example embodiment having one or more features of the electrical connector assembly of the previous paragraph, the first terminal housing is formed of first material and the second terminal housing is formed of a second material different than the first terminal housing.

In an example embodiment having one or more features of the electrical connector assembly of the previous paragraph, the first material is infrared transparent and the second material is infrared absorbent.

In an example embodiment having one or more features of the electrical connector assembly of the previous paragraph, the longitudinal axis of the attachment end is substantially perpendicular to the lateral axis of the connection end.

According to one embodiment of the invention, method of manufacturing an electrical connector assembly is provided. The method includes the steps of:
a) providing an electrical terminal having an attachment end extending along a longitudinal axis configured to be attached to a wire cable and a connection end extending along a lateral axis configured to be attached to a corresponding mating terminal;
b) providing a first terminal housing having a first cavity extending along the longitudinal axis in which the attachment end is disposed, the first cavity defining a cable opening through which the wire cable extends and defining a terminal extension opening through which the connection end extends;
c) providing a second terminal housing having a second cavity extending along the lateral axis in which the attachment end is disposed, the second cavity defining a terminal reception opening through which the connection end is received and a mating opening configured to receive the corresponding mating terminal, wherein the first terminal housing defines a first attachment surface surrounding the terminal extension opening and the second terminal housing defines a second attachment surface surrounding the terminal reception opening;
d) inserting the attachment end of the electrical terminal within the first cavity of the first terminal housing;
e) inserting the connection end of the electrical terminal within the second cavity of the second terminal housing; and
f) sealing the first attachment surface to the second attachment surface.

In an example embodiment having one or more features of method of the previous paragraph, the first attachment surface defines a circumferential ridge surrounding the terminal extension opening and the second attachment surface defines a circumferential groove surrounding the terminal reception opening. The method further includes the step of disposing the circumferential ridge within the circumferential groove.

In an example embodiment having one or more features of method of the previous paragraph, step f), sealing the first attachment surface to the second attachment surface, is performed by welding the circumferential ridge to the circumferential groove using an infrared laser welding process.

In an example embodiment having one or more features of method of the previous paragraph, step f), sealing the first attachment surface to the second attachment surface, is performed by welding the first attachment surface to the second attachment surface.

In an example embodiment having one or more features of method of the previous paragraph, step f), sealing the first attachment surface to the second attachment surface, is performed using a laser welding process.

In an example embodiment having one or more features of method of the previous paragraph, the first terminal housing is formed of first material and the second terminal housing is formed of a second material different than the first terminal housing.

In an example embodiment having one or more features of method of the previous paragraph, the first material is infrared transparent and the second material is infrared absorbent.

In an example embodiment having one or more features of method of the previous paragraph, the longitudinal axis of the attachment end is substantially perpendicular to the lateral axis of the connection end.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
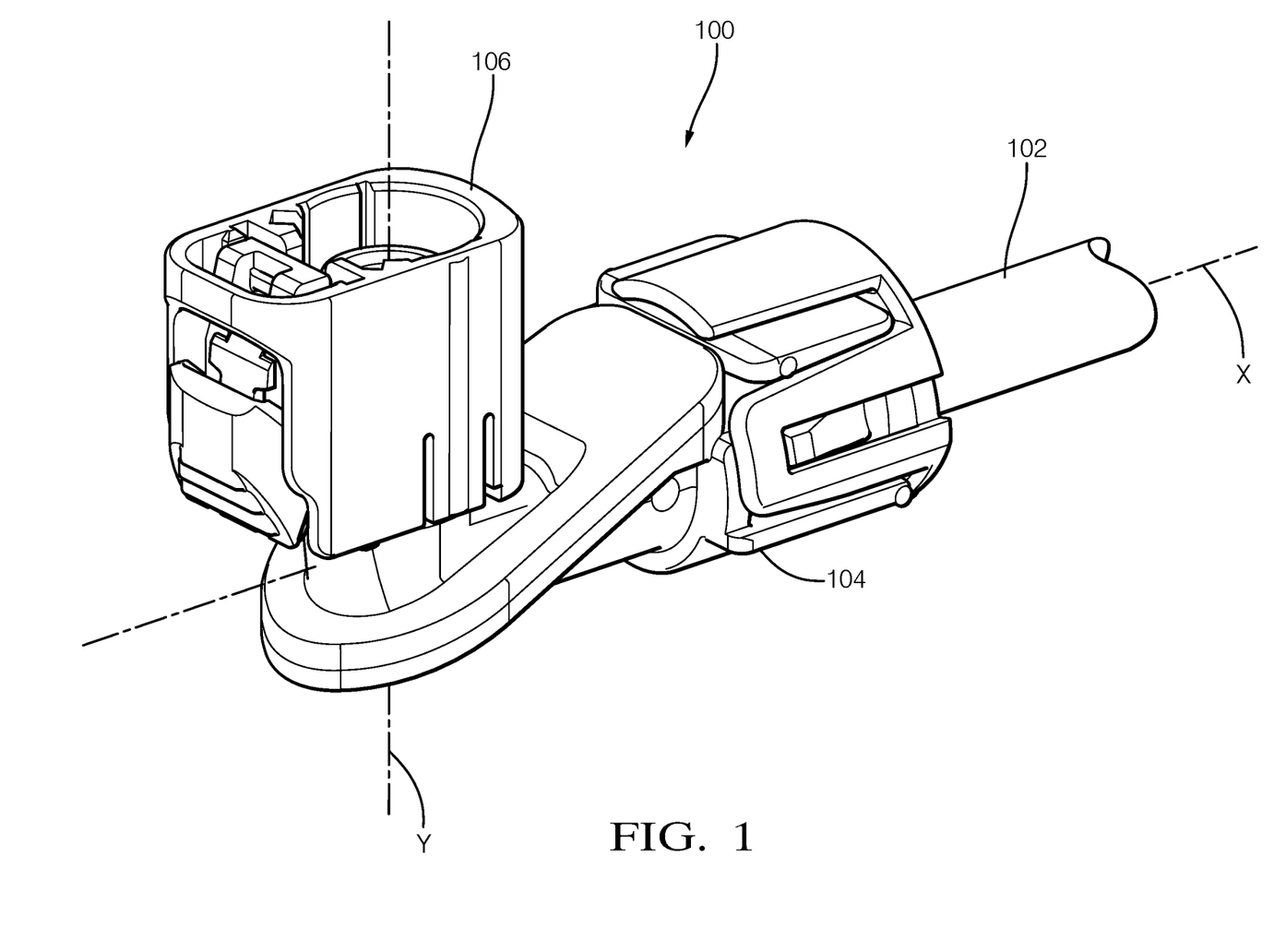
FIG. 1 is a perspective view of an angled electrical connector assembly engaged with a mating connector assembly according to one embodiment of the invention.

FIG. 1 illustrates an electrical connector system 100 used to interconnect a wire cable 102, e.g. a coaxial cable. The illustrated connector system includes a right angled coaxial connector 104 and a straight mating coaxial connector 106. The connectors shown in FIG. 1 each conform to a FAKRA standard.

Figure 2:
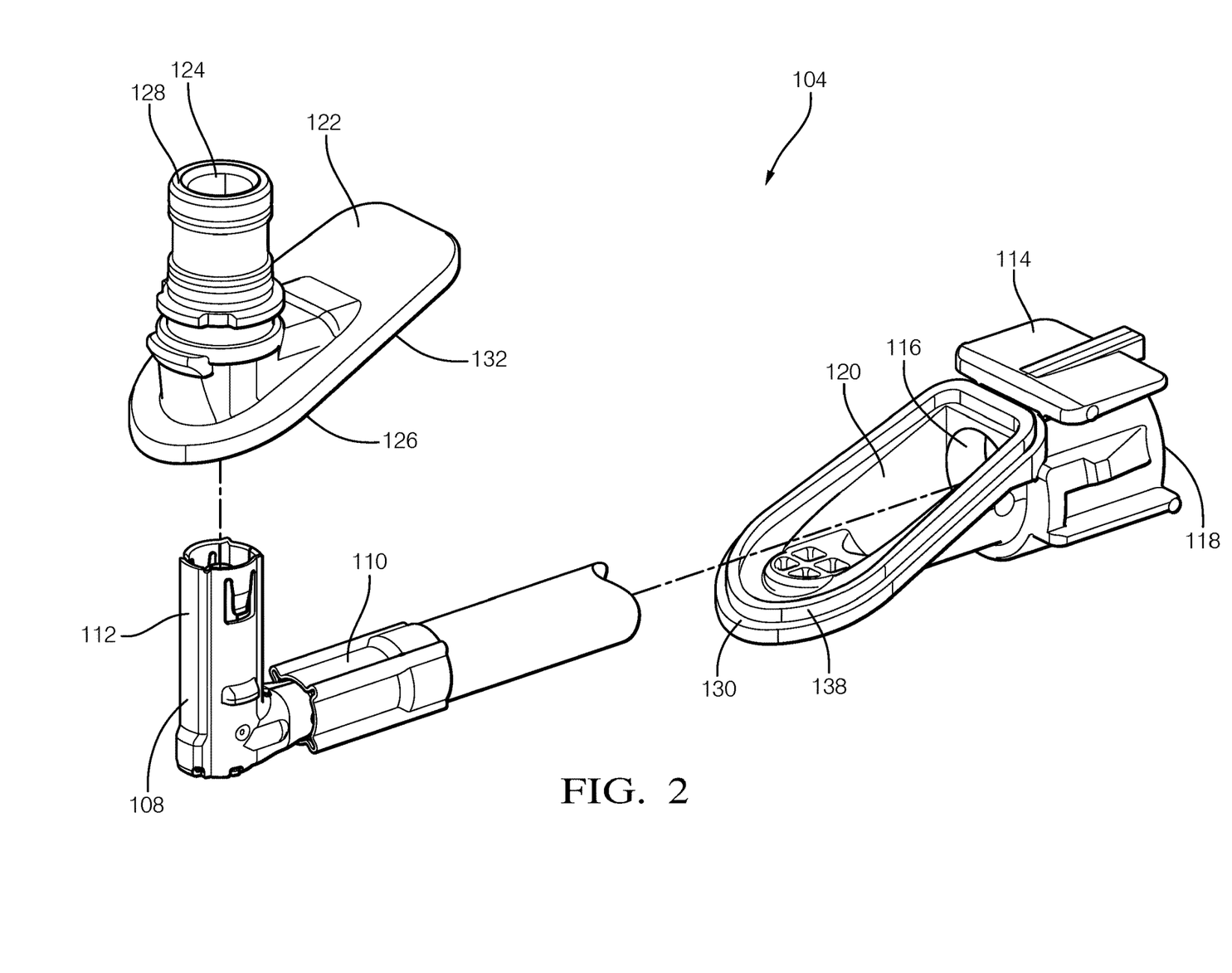
FIG. 2 is an exploded view of the angled electrical connector assembly of FIG. 1 according to one embodiment of the invention.
Figure 3:
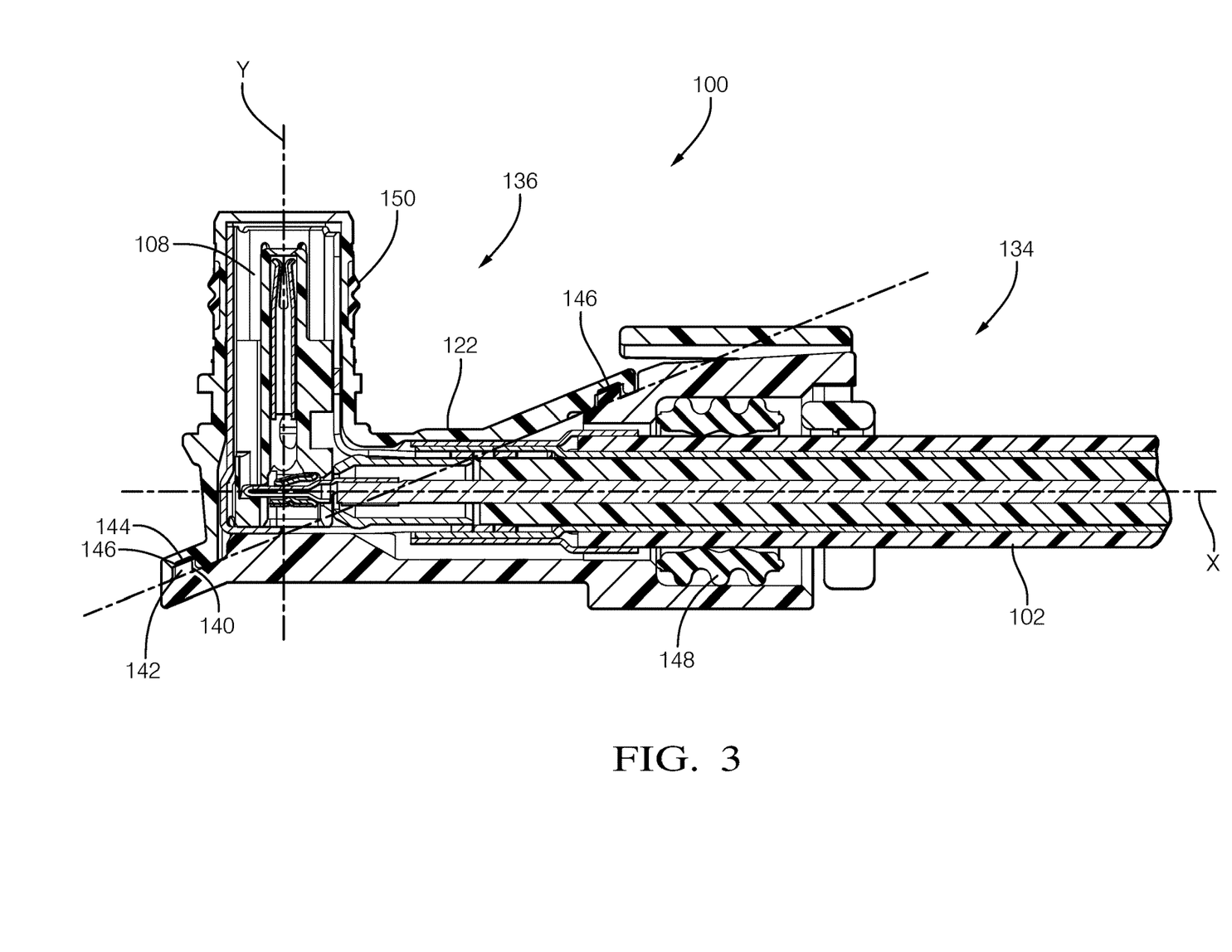
FIG. 3 is a cross section side view of the angled electrical connector assembly of FIG. 1 according to one embodiment of the invention.

As best illustrated in FIGS. 2 and 3, the right angled connector 104 includes a right angled coaxial electrical terminal, hereinafter referred to as the terminal 108 that has an attachment end 110 extending along a longitudinal axis X configured to be attached to the wire cable 102 and a connection end 112 extending along a lateral axis Y configured to be attached to a corresponding mating terminal (not shown) contained in the mating connector 106. Since this is a right angled terminal, the longitudinal axis X of the attachment end 110 is substantially perpendicular to the lateral axis Y of the connection end 112. As used herein, substantially perpendicular means ±5 degrees of absolutely perpendicular.

The terminal 108 is contained within an electrically insulative two part housing. A first terminal housing, hereinafter referred to as the first housing 114 has a first cavity 116 that extends along the longitudinal axis X in which the attachment end 110 is disposed. The first cavity 116 defines two openings, a cable opening 118 through which the wire cable 102 extends and a terminal extension opening 120 through which the connection end 112 of the right angled terminal extends. A second terminal housing, hereinafter referred to as the second housing 122 has a second cavity 124 that extends along the lateral axis Y in which the attachment end 110 is disposed. The second cavity 124 also defines two openings, a terminal reception opening 126 through which the connection end 112 is received and a mating opening 128 configured to receive the corresponding mating connector 106. The first housing 114 defines a first attachment surface 130 that circumferentially surrounds the terminal extension opening 120. The second housing 122 defines a second attachment surface 132 that surrounds the terminal reception opening 126. The first attachment surface 130 is sealed to the second attachment surface 132, thereby providing a water-tight, preferably hermetic, seal between the first and second housings 114, 122. The first attachment surface 130 forms a first acute angle 134 relative to the longitudinal axis X and the second attachment surface 132 forms a second acute angle 136 relative to the lateral axis Y. Since this is a right angled connector 104, the second acute angle 136 is complementary to the first acute angle 134, i.e. the sum of a first angular value of the first acute angle 134 and a second angular value of the second acute angle 136 is about 90 degrees. Preferably, the first angular value of the first acute angle 134 is about 45 degrees and the second angular value of the second acute angle 136 is about 45 degrees. As used herein, "about" a specific angular value means ±5 degrees of the recited specific angular value.

Figure 4:
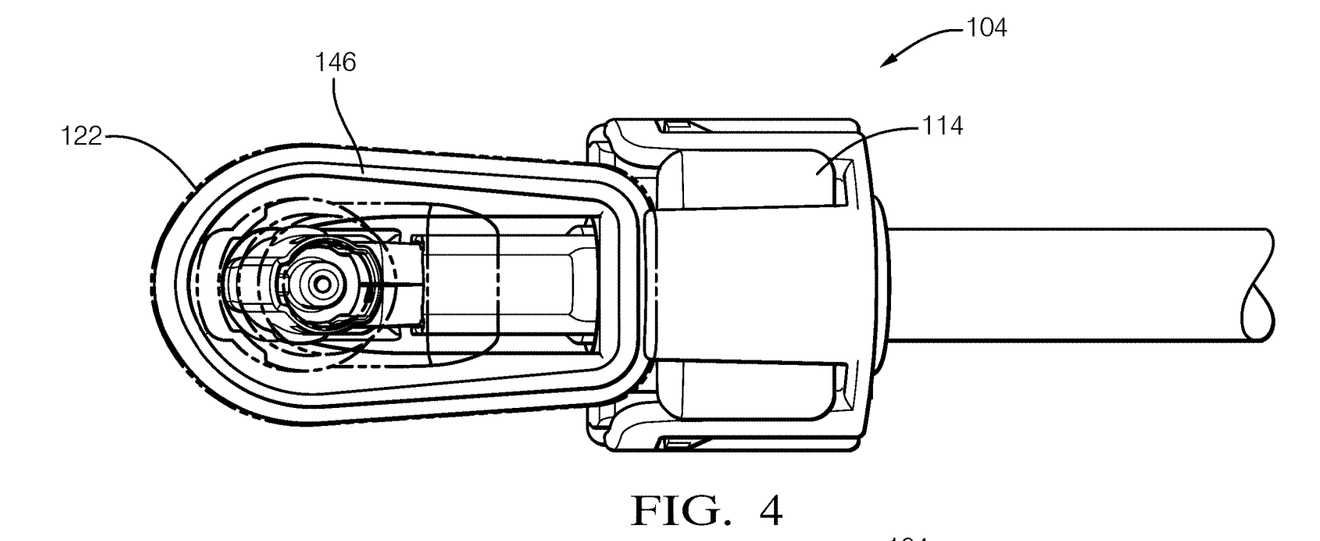
FIG. 4 is a cross section top view of the angled electrical connector assembly of FIG. 1 according to one embodiment of the invention.
Figure 5:
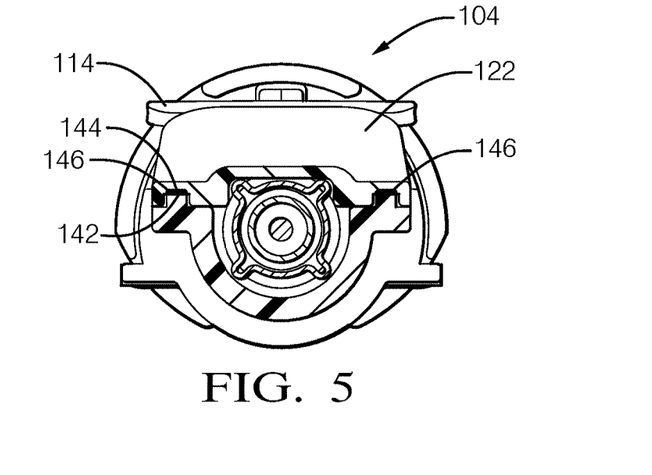
FIG. 5 is a cross section end view of the angled electrical connector assembly of FIG. 1 according to one embodiment of the invention.

The first attachment surface 130 defines a circumferential ridge, hereafter referred to as the ridge 138 that surrounds the terminal extension opening 120 and the second attachment surface 132 defines a circumferential groove, hereinafter referred to as the groove 140, surrounding the terminal reception opening 126 in which the ridge 138 is received. The first attachment surface 130 is welded to the second attachment surface 132 by welding the upper surface 142 of the ridge 138 to the lower surface 144 of the groove 140 using an infrared laser welding process. The first housing 114 is formed of an infrared absorbent material, such as a polymer that is doped with an infrared absorbing pigment, and the second housing 122 is formed of an infrared transparent material, such as polyethylene or polypropylene. When infrared laser energy is applied to the area of the ridge 138, the laser energy passes through the second housing 122 and is absorbed by the ridge 138 of the first housing 114, thereby forming a fused region 146 between the first housing 114 to the second housing 122 as shown in FIGS. 3, 4, and 5. Infrared welding systems capable of preforming such infrared laser welding are SIMULTANEOUS THROUGH TRANSMISSION INFRARED® welding systems available from Branson Ultrasonics Corporation of Danbury, Conn.

As shown in FIG. 3, the right angled connector 104 also includes a compliant cable seal 148 and a complaint housing seal 150 to inhibit entry of environmental contaminants, such as water, dust, or electrolytes, into the cavities that may corrode the terminal 108.

In prior designs connector designs, right angled FAKRA compliant connectors had used a one piece housing that contained a two piece terminal shield in order to meet environmental sealing requirements. This configuration was found to be costly and could exhibit unstable connection properties due to the two piece terminal.

The angled parting line of the two piece housing 114, 122 of the right angled connector 104 illustrated in FIGS. 1-5 provides the benefit of allowing direct insertion of a one-piece terminal shield which provides more reliable connection properties than a two piece terminal. The infrared laser welding of the ridge 138 and groove 140 features allow the seam between the first and second housings 114, 122 to provide a water tight or hermitic seal.

Figure 6:
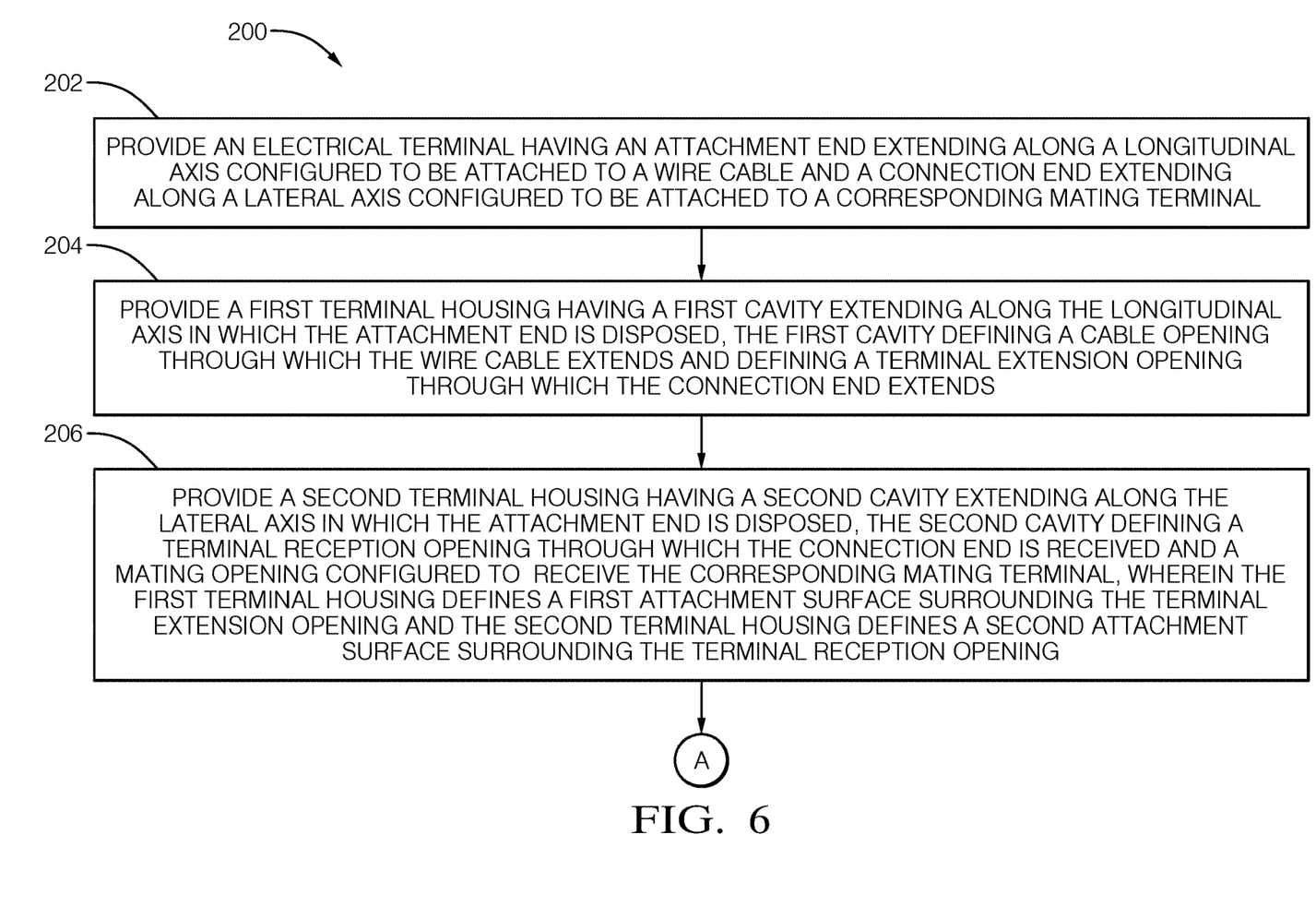
FIG. 6 is a flow chart of a method of manufacturing the angled electrical connector assembly of FIG. 1 according to another embodiment of the invention.

FIG. 6 illustrates an example of a method 200 of method 200 of manufacturing the terminal 108 according to one embodiment of the invention. The method 200 includes the following steps:

STEP 202, PROVIDE AN ELECTRICAL TERMINAL, includes providing a terminal 108 having an attachment end 110 extending along the longitudinal axis X configured to be attached to a wire cable 102 and a connection end 112 extending along the lateral axis Y configured to be attached to a corresponding mating terminal. The longitudinal axis X of the attachment end 110 is substantially perpendicular to the lateral axis Y of the connection end 112;

STEP 204, PROVIDE A FIRST TERMINAL HOUSING, includes providing a first housing 114 having a first cavity 116 extending along the longitudinal axis X in which the attachment end 110 is disposed, the first cavity 116 defining a cable opening 118 through which the wire cable 102 extends and defining a terminal extension opening 120 through which the connection end 112 extends;

STEP 206, PROVIDE A SECOND TERMINAL HOUSING, includes providing a second housing 122 having a second cavity 124 extending along the lateral axis Y in which the attachment end 110 is disposed, the second cavity 124 defining a terminal reception opening 126 through which the connection end 112 is received and a mating opening 128 configured to receive the corresponding mating connector 106, wherein the first housing 114 defines a first attachment surface 130 surrounding the terminal extension opening 120 and the second housing 122 defines a second attachment surface 132 surrounding the terminal reception opening 126;

STEP 208, INSERT THE ELECTRICAL TERMINAL WITHIN THE FIRST AND SECOND TERMINAL HOUSINGS, includes inserting the attachment end 110 of the terminal 108 within the first cavity 116 of the first housing 114 and inserting the connection end 112 of the terminal 108 within the second cavity 124 of the second housing 122;

The first attachment surface 130 may define a ridge 138 surrounding the terminal extension opening 120 and the second attachment surface 132 defines a groove 140 surrounding the terminal reception opening 126. STEP 210, DISPOSE THE RIDGE WITHIN THE GROOVE, is an optional sub-step of STEP 202 that includes disposing the ridge 138 within the groove 140; and STEP 212, SEAL THE FIRST TERMINAL HOUSING TO THE SECOND TERMINAL HOUSING, includes sealing the first attachment surface 130 to the second attachment surface 132. STEP 212 may be performed by welding the first attachment surface 130 to the second attachment surface 132, e.g. by a laser welding process. STEP 212 may be performed by welding the ridge 138 to the groove 140 using an infrared laser welding process. In this case, the first housing 114 is formed of first material and the second housing 122 is formed of a second material different than the first housing. The first material is substantially infrared transparent and the second material is infrared absorbent.

While the example electrical connector presented herein is a right angled configuration, other embodiments of the invention may be envisioned having an angle between the attachment end 110 and the connector end of the terminal 108 in a range of 1 to 179 degrees.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. An electrical connector assembly, comprising:
an electrical terminal having an attachment end extending along a longitudinal axis configured to be attached to a wire cable and a connection end extending along a lateral axis configured to be attached to a corresponding mating terminal;
a first terminal housing having a first cavity extending along the longitudinal axis in which the attachment end is disposed, the first cavity defining a cable opening through which the wire cable extends and defining a terminal extension opening through which the connection end extends; and
a second terminal housing having a second cavity extending along the lateral axis in which the connection end is disposed, the second cavity defining a terminal reception opening through which the connection end is received and a mating opening configured to receive the corresponding mating terminal, wherein the first terminal housing defines a first attachment surface surrounding the terminal extension opening and the second terminal housing defines a second attachment surface surrounding the terminal reception opening, wherein the first attachment surface is sealed to the second attachment surface, and wherein the first attachment surface forms a first angle relative to the longitudinal axis and the second attachment surface forms a second angle relative to the lateral axis.

2. The electrical connector assembly according to claim 1, wherein the second angle is complementary to the first angle.

3. The electrical connector assembly according to claim 1, wherein a first angular value of the first angle is about 45 degrees and a second angular value of the second angle is about 45 degrees.

4. The electrical connector assembly according to claim 1, wherein the first attachment surface defines a circumferential ridge surrounding the terminal extension opening and the second attachment surface defines a circumferential groove surrounding the terminal reception opening in which the circumferential ridge is received.

5. The electrical connector assembly according to claim 4, wherein the circumferential ridge is welded to the circumferential groove using an infrared laser welding process.

6. The electrical connector assembly according to claim 1, wherein the first attachment surface is welded to the second attachment surface, thereby forming a watertight joint between the first and second terminal housings.

7. The electrical connector assembly according to claim 1, wherein the first attachment surface is welded to the second attachment surface using a laser welding process.

8. The electrical connector assembly according to claim 1, wherein the first terminal housing is formed of first material and the second terminal housing is formed of a second material different than the first terminal housing.

9. The electrical connector assembly according to claim 8, wherein the first material is infrared transparent and the second material is infrared absorbent.

10. The electrical connector assembly according to claim 1, wherein the longitudinal axis of the attachment end is substantially perpendicular to the lateral axis of the connection end.

11. A method of manufacturing an electrical connector assembly, comprising the steps of:
providing an electrical terminal having an attachment end extending along a longitudinal axis configured to be attached to a wire cable and a connection end extending along a lateral axis configured to be attached to a corresponding mating terminal;

providing a first terminal housing having a first cavity extending along the longitudinal axis in which the attachment end is disposed, the first cavity defining a cable opening through which the wire cable extends and defining a terminal extension opening through which the connection end extends;

providing a second terminal housing having a second cavity extending along the lateral axis in which the attachment end is disposed, the second cavity defining a terminal reception opening through which the connection end is received and a mating opening configured to receive the corresponding mating terminal, wherein the first terminal housing defines a first attachment surface surrounding the terminal extension opening and the second terminal housing defines a second attachment surface surrounding the terminal reception opening;

inserting the attachment end of the electrical terminal within the first cavity of the first terminal housing;

inserting the connection end of the electrical terminal within the second cavity of the second terminal housing; and sealing the first attachment surface to the second attachment surface.

12. The method according to claim 11, wherein the first attachment surface defines a circumferential ridge surrounding the terminal extension opening and the second attachment surface defines a circumferential groove surrounding the terminal reception opening and wherein the method further includes the step of disposing the circumferential ridge within the circumferential groove.

13. The method according to claim 12, wherein the step of sealing the first attachment surface to the second attachment surface is performed by welding the circumferential ridge to the circumferential groove using an infrared laser welding process.

14. The method according to claim 11, wherein the step of sealing the first attachment surface to the second attachment surface is performed by welding the first attachment surface to the second attachment surface.

15. The method according to claim 11, wherein the step of sealing the first attachment surface to the second attachment surface is performed using a laser welding process.

16. The method according to claim 11, wherein the first terminal housing is formed of first material and the second terminal housing is formed of a second material different than the first terminal housing.

17. The method according to claim 16, wherein the first material is infrared transparent and the second material is infrared absorbent.

18. The method according to claim 11, wherein the longitudinal axis of the attachment end is substantially perpendicular to the lateral axis of the connection end.

* * * * *